(12) United States Patent
Asplund

(10) Patent No.: US 9,958,942 B2
(45) Date of Patent: May 1, 2018

(54) DATA INPUT DEVICE

(71) Applicant: ASPLUND DATA AB, Västerås (SE)

(72) Inventor: Lars Asplund, Vasteras (SE)

(73) Assignee: ASPLUND DATA AB, Vasteras (SE)

( * ) Notice: Subject to any disclaimer, the term of this patent is extended or adjusted under 35 U.S.C. 154(b) by 0 days. days.

(21) Appl. No.: 14/382,195

(22) PCT Filed: Feb. 28, 2013

(86) PCT No.: PCT/EP2013/054084
§ 371 (c)(1),
(2) Date: Aug. 29, 2014

(87) PCT Pub. No.: WO2013/127948
PCT Pub. Date: Sep. 6, 2013

(65) Prior Publication Data
US 2015/0022446 A1  Jan. 22, 2015

(30) Foreign Application Priority Data
Mar. 1, 2012 (EP) .................................... 12157662

(51) Int. Cl.
G06F 3/01 (2006.01)
G06F 3/03 (2006.01)

(52) U.S. Cl.
CPC .............. G06F 3/014 (2013.01); G06F 3/017 (2013.01); G06F 3/0304 (2013.01)

(58) Field of Classification Search
None
See application file for complete search history.

(56) References Cited

U.S. PATENT DOCUMENTS 5,796,354 A   8/1998 Cartabiano et al.
6,097,374 A   8/2000 Howard
(Continued)

FOREIGN PATENT DOCUMENTS

EP   1 594 039 A1   11/2005
EP   1594039 A1    11/2005
(Continued)

OTHER PUBLICATIONS

Ahmad, Farooq, and Petr Musilek. "UbiHand: a wearable input device for 3D interaction." ACM SIGGRAPH 2006 Research posters. ACM, 2006.*
European Patent Office Action for Application No. 12 157 662.3-1972 dated Sep. 16, 2014.
(Continued)

Primary Examiner — Jennifer Mehmood
Assistant Examiner — Krishna Neupane
(74) Attorney, Agent, or Firm — Moore & Van Allen PLLC; W. Kevin Ransom

(57) ABSTRACT

The present invention relates to a wearable device and a method for determining a position of at least one finger of a hand relative to a predetermined reference point comprising a sensor unit in the palm of the hand comprising at least one sensor, a logic unit in operative engagement with a computer device and configured to generate a position signal based on the registered finger position, and to interpret and convert the signal to a command to be processed by the computer device, a housing at least partly enclosing the sensor unit and an attachment member. The wearable device is characterized in that the sensor is at least one image sensor directed towards a respective distal end of the at least one finger and configured to determine the position of the finger in relation to the wearable device.

13 Claims, 5 Drawing Sheets

(56) References Cited

U.S. PATENT DOCUMENTS

| | | | |
|---|---|---|---|
| 7,362,305 | B2 | 4/2008 | Alsio et al. |
| 2002/0024500 | A1 | 2/2002 | Howard |
| 2005/0172734 | A1* | 8/2005 | Alsio .................. G06F 3/014 73/865.4 |
| 2005/0179644 | A1* | 8/2005 | Alsio .................. G06F 3/014 345/156 |
| 2005/0232467 | A1* | 10/2005 | Mohri .................. G06F 3/0304 382/103 |
| 2009/0322673 | A1* | 12/2009 | Cherradi El Fadili . G06F 3/017 345/157 |
| 2010/0090949 | A1 | 4/2010 | Tianqiao et al. |
| 2013/0069931 | A1* | 3/2013 | Wilson .................. G06F 1/1694 345/419 |
| 2013/0158946 | A1* | 6/2013 | Scherberger ............ G06F 3/014 702/151 |

FOREIGN PATENT DOCUMENTS

| | | |
|---|---|---|
| EP | 1 879 129 A1 | 1/2008 |
| EP | 1879129 A1 | 1/2008 |
| EP | 2 418 562 A1 | 8/2010 |

OTHER PUBLICATIONS

Andrew Vardy et al.; "The WristCam as Input Device"; 1999 IEEE.
International Search Report for PCT/EP2013/054084 dated Apr. 22, 2013.
European Search Report for Application No. 12 157 662.3-1972, Ref. 401145EP dated Sep. 22, 2016.
UbiHand: A Wearable Input Device for 3D Interaction; Farooq Ahmad (Canada) and Petr Musilek (Canada); In Proceedings of Fourth IEEE International Conference on Pervasive Computing and Communications (Per Com '06), IEEE, 2-11.

* cited by examiner

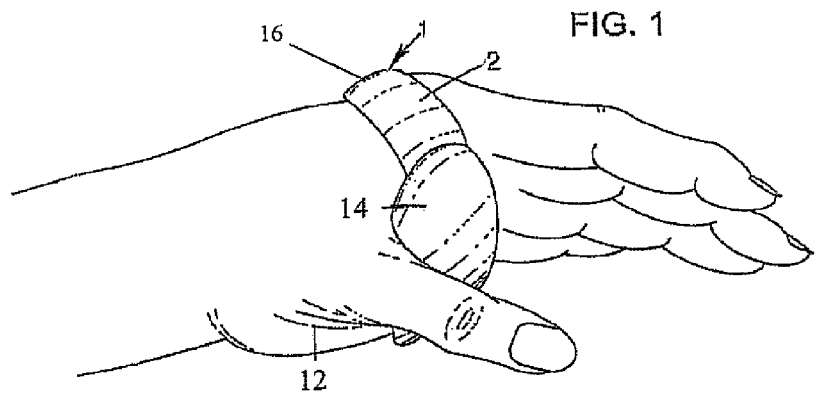
FIG. 1
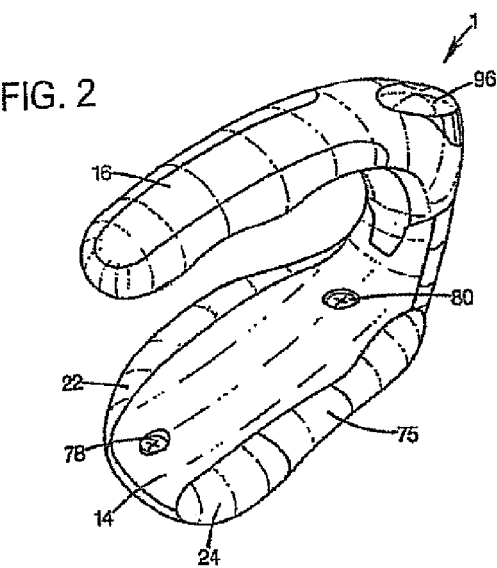
FIG. 2
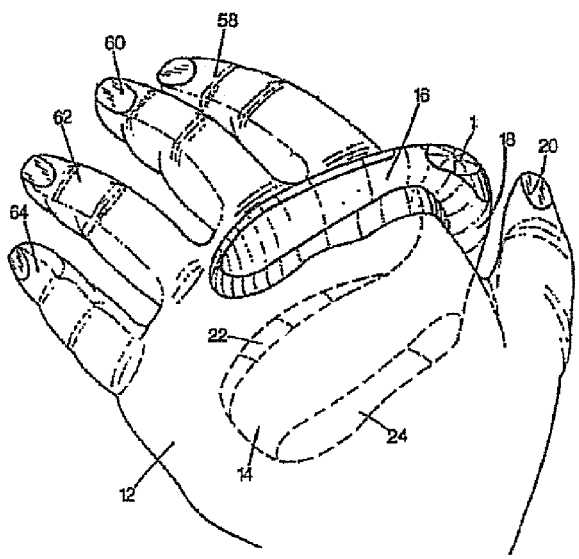

DATA INPUT DEVICE

THE FIELD OF THE INVENTION

The present invention refers to a wearable device according the pre-characterized portion of claim 1. The present invention also refers to a method for determining a position of at least one finger on a hand relative to a predetermined reference point according the pre-characterized portion of claim 9.

BACKGROUND OF THE INVENTION AND PRIOR ART

Conventional interfaces between a computer or a game station and a user are typically a keyboard, a computer mouse, a joystick or a game pad that has a number of control buttons. With the increasing popularity of mobile phones, smart phones and mini computers, the use of conventional interfaces may become inconvenient. There is a need for a more convenient and reliable way to enter and manipulate data in a device such as a computer, play station or phone, especially for non-stationary applications.

The prior art describes wearable devices that can be attached to a hand. These devices are configured to determine a position of fingers. For example U.S. Pat. No. 7,092,785 describes a computer input device, which has a sensor unit placed in the palm of the hand and an upper unit placed behind the knuckles of the hand and connected with the sensor unit. The sensor unit comprises sensors with transducers that are in operative engagement with the fingers. The sensor comprises a position sensor, which is associated with an electrical sign displayed on a screen, such as a letter or word on a computer screen. Bending and stretching of the fingers affects the transducers and causes the sensor to indicate a new value, which in turn may result in a new sign on the screen. A logic unit is in operative engagement with a computer device and configured to generate a position signal based on the registered finger position and to interpretate and convert the signal into a command to be processed by the computer device.

U.S. Pat. No. 5,796,354 describes a device comprising a glove based assembly, whereby the sensing device is comprised in the palm of the hand for detecting directional movement of the user's hand relative to the user's arm.

US 2009/03226734 discloses a wearable device whereby the sensors comprise LED or laser light and corporate with a lens system, whereby angles of light that reflected from the surface under the hand is used for measuring changes in position of the fingers. The device may comprise a second sensor, which senses the position of the device on the surface under the hand. This sensor functions similar to existing optical mouse sensors and is used by the device to interpret the position of the pointer on the display.

U.S. Pat. No. 6,097,374 discloses a wearable device comprising separate emitters that cooperate with several detectors, which together are used to measure movements of the fingers. This device does not allow for the registration of three dimensional movements of fingers and hands simultaneously.

There is a need for an improved device that can be used for virtual data input, whereby the signals from the fingers and hand can be displayed faster and with more accuracy compared to the known devices.

SUMMARY OF THE INVENTION

The object of the present invention is to provide an improved wearable device for determining the position of at least one finger on a hand as well as the movement of said finger. It is another object to provide a wearable device to determine the position and movement of one or two hands. The device is preferably insensitive to individual differences and adaptable to each user. It is a further object of the invention to provide a wearable device, which quickly, accurately and virtually can display signs, symbols and/or gestures of at least one finger and/or hand on a screen. Another object of the invention is to provide a device that is substantially insensitive to the surrounding environment.

The objects are achieved by the wearable device initially defined, which is characterized in that the at least one sensor comprises at least one image sensor directed towards a respective distal end of the at least one finger and configured to determine the position of the finger in relation to the wearable device.

The wearable device according to the present invention uses image processing to determine the position of the distal end of the fingers. The images from at least one image sensor are used for calculating the distance and relative angle between the wearable device and the finger top. Any change in distance or angle can then be used to measure changes in position or movements of the finger. Measuring changes in finger positions can be done more accurately and faster compared to measuring changes in pressures or through electric field sensing. Also, the velocity by which a command subsequently can be displayed as an electrical symbol on a screen is increased. Different positions of the fingers and movements of the fingers to new positions can be correlated to the typing positions on a keyboard.

In a further embodiment, the at least one sensor is also configured to determine the position of the at least one finger and hand in relation to a surface under the hand. This surface may be a static surface such as the surface of a table, or a part of a human body wearing the wearable device such as a thigh. The position and movements of one or more finger or one or two hand can be registered. This allows for example for the display of an electrical symbol derived from gestures or sign language. The new device, especially after calibration, is insensitive to the surrounding environment and could even be used under water, which is not possible using electric field sensing.

In one embodiment, the sensor uses ambient light.

In a further embodiment, the sensor uses structured light.

In another embodiment, the logic unit further comprises an inertia measurement unit configured to also measure a translational and rotational movement of the hand. In another embodiment, the inertia measurement unit comprises a compass. In a further embodiment, the inertia measurement unit is also configured to measure accelerations. These embodiments increase the amount and types of signs, symbols or gestures that can be registered.

In an alternative embodiment, the sensor unit further comprises a second sensor, which is an image sensor and configured to, in cooperation with the first image sensor, obtain accurate three-dimensional measurements of the position of the at least one finger and/or to determine the position and orientation of the hand relative to the surface under the hand and/or in relation to the other hand, and/or in relation to another part of a human body. This embodiment is particularly relevant for use of sign language.

In yet another embodiment, the at least one sensor comprises at least one camera directed towards a respective distal end of the at least one finger and configured to determine the position of the finger in relation to the wearable device, and the sensor unit further comprises a second sensor, which is a camera and configured to, in cooperation with the first image sensor, obtain accurate 3D-measurements of the position of the at least one finger and/or to determine the position and orientation of the hand relative to the surface under the hand and/or in relation to the other hand, and/or in relation to another part of a human body, and whereby the logic unit further comprises an inertia measurement unit configured to also measure a translational and rotational movement of the hand, and sensors configured to send signals, as a result of registered positions and movements by the sensors, whereby sensors continuously send signals to respectively calculating units that enable two or more signals to be calculated in the same circuit at the same time by temporarily combining them into a single signal such that a calibration can be performed of the movements of at least one finger and/or hand by moving said finger in one or more predetermined direction and distance in relation to the reference point and in a predetermined direction at a predetermined velocity, whereby for the fingers, the reference point is the wearable device, and for the hand, the reference point is the surface under the hand.

Thus, the device according to the invention may comprise at least two cameras as image sensors together with an inertia measurement unit, and components in the logic unit that allow for calibration in such a way that three dimensional movements of both hand and fingers can be registered, independent of the surface present under the hands when using the device.

In another alternative embodiment, the sensor unit further comprises a light source, which together with the first sensor and/or second sensor is configured to determine the position and orientation of the hand relative to the surface under the hand and/or in relation to the other hand, and/or in relation to another part of the human body. The light source may be any type of light source such as a projector for structured light.

In a further embodiment, the light from the light source is structured light. Measuring a three-dimensional shape of an object using projected light patterns will further improve the accuracy and the velocity by which commands can be displayed as an electrical symbol on a screen comprised in the computer device. The use of infrared light makes it even possible to use the device in the dark.

In yet another alternative embodiment, the sensor unit further comprises a third sensor, which is an image sensor and comprised in an upper unit, and configured to determine the position of the hand relative to an object or surface above the hand. An additional reference point above the hands improves the accuracy of interpretating the three dimensional (3D) position of and movement by the hand and/or at least one finger.

One image sensor may be used to determine the position and movement of at least one finger on the hand as well as the position of the at least one finger and/or hand relative to the surface under the hand. The advantage of having two or more image sensors is that the 3D accuracy of the device improves. A light source may further improve the accuracy. These additional sensors and light source improve the possibility to relate movements made with both hands and all fingers on both hands. The new wearable device has the ability to determine the absolute position of the hands and the absolute position of the fingers. Again, the amount and types of signs, symbols and gestures that can be registered increases dramatically.

The device of the present invention comprises few components and is simple and robust.

The new device allows registering three dimensional movements of both fingers and hands independent of the surrounding environment. The movements of both fingers and hand can be registered with improved accuracy and high velocity. Further, the new device can be used to display electrical symbols on a display that are derived from gestures, symbols or sign language. The amount and types of signs, symbols and gestures that can be registered with the new device are increased compared to the signs that can be registered with the known devices.

The objects of the present invention are also achieved by a method initially described, which is characterized in that the method comprises providing a wearable device comprising
        a sensor unit configured to be arranged in a palm of the hand comprising
            at least one image sensor directed away from the palm in order to register respective distal end of the at least one finger,
            a logic unit in operative engagement with a computer device,
            a housing at least partly enclosing the sensor unit having an opening for the at least one sensor,
            an attachment member configured to attach the sensor unit to the hand;
    a first step of determining the reference point for the relative position of the hand and the at least one finger by holding the hand and the at least one finger in a predetermined position for a predetermined period;
        registering the position of said hand and at least one finger in relation to the wearable device and/or in relation to a surface under the hand;
        generating a signal based on the registered hand and finger position;
    a second step of registering movement of the hand and at least one finger by moving said hand and/or finger in one or more predetermined direction and distance in relation to the reference point,
        registering the positions of said hand and/or at least one finger in relation to the wearable device and/or in relation to a surface under the hand;
        generating a signal based on the registered hand and/or finger positions;
        interpretating and converting the signal to a command to be processed by the computer device, thereby using the relation between the registered positions in the first and the second step;
    optionally repeating the second step.

In one embodiment, the method comprises a third step of learning and memorizing movement of the hand and/or at least one finger by moving the hand and/or at least one finger in one or more predetermined direction at one or more predetermined velocity in relation to the predetermined reference point;
    registering positions of said hand and/or at least one finger in relation to the wearable device and/or in relation to a surface under the hand;
    generating a signal based on the registered hand and/or finger positions;
    interpretating and converting the signal to a command to be processed by the computer device.

In another embodiment, the at least one sensor is configured to register a movement of the at least one finger in relation to the predetermined reference point along a first horizontal axis, along a second horizontal axis perpendicular to the first horizontal axis and along a vertical axis perpendicular to the first and second horizontal axes.

In a further embodiment, the at least one sensor is configured to register a position and movement of at least one hand in relation to the predetermined reference point along a first horizontal axis, along a second horizontal axis perpendicular to the first horizontal axis and along a vertical axis perpendicular to the first and second horizontal axes.

In another embodiment of the method, the logic unit further comprises an inertia measurement unit configured to also measure a translational and rotational movement of the hand. In a further embodiment, the inertia measurement unit is also configured to measure accelerations.

In one embodiment, the method comprises
providing a wearable device comprising
a sensor unit configured to be arranged in a palm of the hand comprising
at least one camera directed away from the palm in order to register respective distal end of the at least one finger, and a second sensor, which is a camera and configured to, in cooperation with the first image sensor, obtain accurate 3D-measurements of the position of the at least one finger and/or to determine the position and orientation of the hand relative to the surface under the hand and/or in relation to the other hand, and/or in relation to another part of a human body,
a logic unit in operative engagement with a computer device, whereby the logic unit further comprises an inertia measurement unit configured to also measure a translational and rotational movement of the hand, and sensors configured to send signals, as a result of registered positions and movements by the sensors, whereby sensors continuously send signals to the respectively calculating units that enable two or more signals to be calculated in the same circuit at the same time by temporarily combining them into a single signal such that a calibration can be performed of the movements of at least one finger and/or hand by moving said finger in one or more predetermined direction and distance in relation to the reference point and in a predetermined direction at a predetermined velocity,
a housing at least partly enclosing the sensor unit having an opening for the at least one sensor,
an attachment member configured to attach the sensor unit to the hand;
a first step of determining the reference point for the relative position of the hand and the at least one finger by holding the hand and the at least one finger in a predetermined position for a predetermined period;
registering the position of said hand and at least one finger in relation to the wearable device and/or in relation to a surface under the hand;
generating a signal based on the registered hand and finger position;
a second step of registering movement of the hand and at least one finger by moving said hand and/or finger in one or more predetermined direction and distance in relation to the reference point,
registering the positions of said hand and/or at least one finger in relation to the wearable device and/or in relation to a surface under the hand;
generating a signal based on the registered hand and/or finger positions;
interpretating and converting the signal to a command to be processed by the computer device, thereby using the relation between the registered positions in the first and the second step;
optionally repeating the second step,
a third step of learning and memorizing movement of the hand and/or at least one finger by moving the hand and/or at least one finger in one or more predetermined direction at one or more predetermined velocity in relation to the predetermined reference point;
registering positions of said hand and/or at least one finger in relation to the wearable device and/or in relation to a surface under the hand, whereby for the fingers, the reference point is the wearable device, and for the hand, the reference point is the surface under the hand;
generating a signal based on the registered hand and/or finger positions;
interpretating and converting the signal to a command to be processed by the computer device.

In a further embodiment of the method, the computer device comprises a screen configured to visualise one or more processed command as an electrical symbol on the screen.

In yet another embodiment of the method, the electric symbol is associated with a gesture, a symbol or sign language.

The method according to the invention allows for measurement and calibration of positions and movements of finger(s) and/or hand(s) for each individual using the wearable device. Individual differences become neglectable. Nor is any force needed by the individual using the device to press down any transducers.

Once calibrated, the new device can be used for virtually data input. The sensor(s) allows for full three dimensional coordination of finger and hand movements (translation and rotation). Data and signs can be visualised on a screen with improved accuracy and at high velocity using the new wearable device and method. The use of the device can be totally insensitive to the surrounding environment.

In another embodiment, a computer program is configured to perform the method described above.

BRIEF DESCRIPTION OF THE DRAWINGS

The present invention will now be explained more closely by means of a description of various embodiments and with reference to the drawings attached hereto.

FIG. 1 shows a wearable device according to one embodiment of the invention

FIG. 2 shows a wearable device according to another embodiment of the invention

DETAILED DESCRIPTION OF VARIOUS EMBODIMENTS OF THE INVENTION

Figure 3:
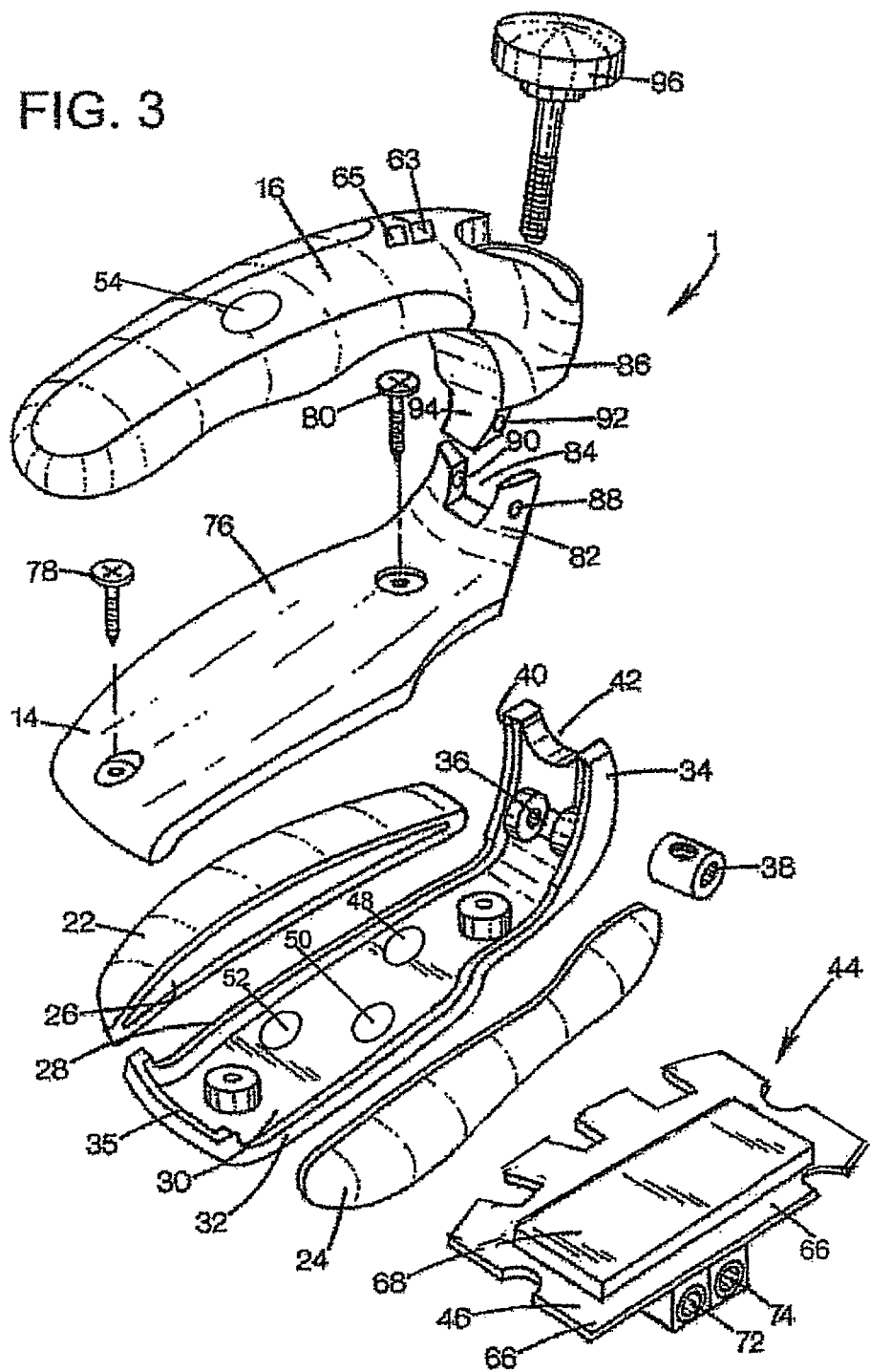
FIG. 3 shows a cross-sectional view of the wearable device of FIG. 2

FIG. 1 shows a wearable device 1 according to one embodiment of the present invention, which is preferably placed in a palm of a hand 12. Also shown is a attachment member 2 around the hand, whereby a sensor unit 14 is attached to the attachment member 2. The attachment member 2 may be a stretchable band.

FIG. 2 shows a wearable device 1 according to another embodiment of the invention comprising an upper unit 16 above the hand and the sensor unit 14 in the palm of the hand, whereby the units 14, 16 are connected with a side unit 18. Details about the device are described in U.S. Pat. No. 7,092,785, which is hereby incorporated by reference.

Figure 4:
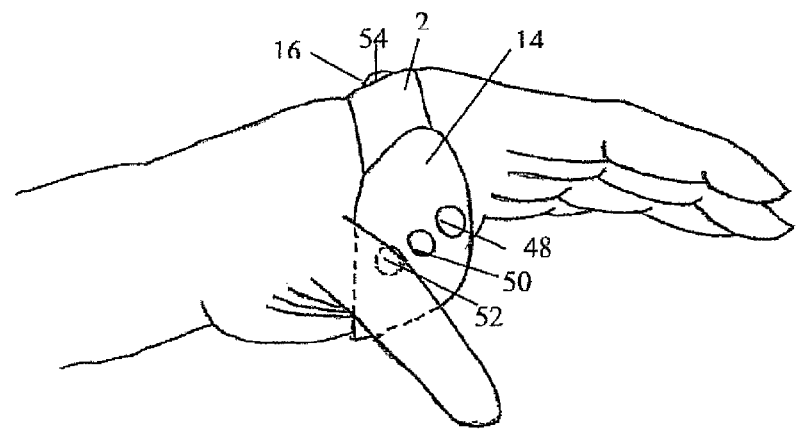
FIG. 4 shows the wearable device of FIG. 1

FIG. 4 shows a simplified view of a preferred embodiment of the invention. The invention is not limited to this specific example and it is to be understood that the devices may have different forms and shapes. The sensor unit 14 comprises at least one sensor 48. The sensor is an image sensor and may for example be a wide angle camera with up to 180° detection view. In addition, the sensor unit 14 may comprise one or more further sensors. These additional sensors may be a second image sensor 52 and/or a light source 50. The light source 50 may be a projector for structured light. The wearable device 1 may also comprise a sensor 54 on the back side of the hand in the upper unit 16. This sensor 54 is preferably an image sensor. The wearable device 1 may comprise one image sensor 48 in sensor unit 14, optionally together with a third image sensor 54 in the upper unit 16. Or, the wearable device 1 comprises one image sensor 48 together with a second image sensor 52, optionally together with a third image sensor 54 in the upper unit 16. Or, the wearable device 1 comprises one image sensor 48 together with the light source 50, optionally together with a third image sensor 54 in the upper unit 16. Or, the wearable device 1 comprises one image sensor 48 together with a second image sensor 52 and the light source 50, optionally together with a third image sensor 54 in the upper unit 16.

The image sensor may be sensitive for different kinds of light. For example, infrared light, ambient or day light or a different light may be used. The light may be structured. An advantage of structured-light, such as for example used in structured-light 3D scanners, is a fast and accurate position determination of the at least one finger and/or hand. Instead of scanning one point at a time, structured light scanners can scan multiple points or entire fields of a view at once. This reduces or eliminates the problem of distortion from motion. This technique makes it possible to scan moving objects in real-time and will thus improve the accuracy and velocity by which the signs, symbols and gestures can be displayed.

FIG. 3 shows the device of FIG. 2. In FIG. 3, the sensor unit 14 has a front portion 22, which may be flexible, and a rear portion 24 attached thereto. Portion 22 has a groove 26 defined therein and lower and upper parts of the portion 22 may be applied against front edge 28 of a solid housing 30. Similarly, the portion 24 has a groove (not shown) defined therein and the portion 24 may be applied to back edges 32 of the housing 30. The housing 30 has an upright back 34 having a cavity 36 defined therein for receiving a cylinder part 38. The housing 30 has also a short upright front 35. An upper end 40 of the back 34 has a groove 42 defined therein. Further details about the device are described in U.S. Pat. No. 7,092,785.

FIG. 3 shows how the image sensors 48, 52, 54 and light source 50 can be positioned in the housing 30 in the sensor unit 14 and in the upper unit 16.

A logic unit 44 comprises a central section 66 and has a stiff or bendable battery unit 68 that is in operative engagement with a computer-processing unit on section 66. The invention is not limited to battery units 68 and any suitable power source may be used. Section 66 may also have a converter that converts analogue signals to digital signal. The logic unit 44 may further comprise an inertia measurement unit to register accelerations, translational and rotational movements of the hand. The inertia measurement unit may comprise a compass. The logic unit 44 may be a computer device such as an ASIC, an FPGA, GPU or a computer processor units. The control unit 44 may partly comprise the computer device 100.

The wearable device 1 may be equipped with one or more accelerometers.

The logic unit 44 is dimensioned so that it may fit on top of the housing 30 and between portions 22, 24 when the portions 22, 24 are attached to the housing 30. The one or more image sensor 48, 52, and/or light source 50 are positioned in the housing 30 such that an image of the fingers can be obtained, especially an image of the distal ends of the fingers. The one or more sensor may be located such that the sensor 48, 52 is directed towards the distal end of the thumb 20 and fingers 58, 60, 62 and 64.

The logic unit 44 has a power unit connector 72 and a communication port 74 disposed below and attached to the board 46. It should be noted that the connector 72 and the port 74 may be integrated into one unit. The connector 72 may be used to recharge the battery 68 or to power the logic unit 44. The port 74 may be used to connect the logic unit 44 to a computer or any other suitable device that can receive signals produced by the logic unit 44. The connector 72 and port 74 may be hidden behind an operable lid. Wireless technology such as Bluetooth, radio technology or any other suitable wireless technology may be used to connect the logic unit 44 to a computer device 100.

The wearable device 1 has a cover 76 placed on top of the logic unit 44 and attached to the housing 30 by screws 78, 80 to firmly hold the logic unit 44 between the housing 30 and the cover 76. The various pieces may be adhered together so that screws are not necessary. The cover has an upright back 82 having a cavity 84 defined therein. The upper unit 16 has a back 86 that may be attached to the back 82 in the cavity 84 thereof. The upper unit 16 may be replaced by a strip or band 2. The back 86 may be pivotally attached to the back 82 by inserting a pivot pin through openings 88, 90 of the back 82 and an opening 92 of the lower end 94 of the back 86. An adjustment screw 96 may be attached to the wearable device 1 to adjust the gap between the units 14, 16 and to accommodate the wearable device 1 to different hand sizes. If desired, the wearable device 1 may be attached directly to for example a computer, tablet, telephone, mobile phone, Personal Digital Assistant (PDA), and the like.

The wearable device 1 may also have an on/off function 63 and a pause function 65 built in. It may also be possible to deactivate the wearable device 1 by a certain finger or hand movement or by not using the device for a certain time.

Figure 7:
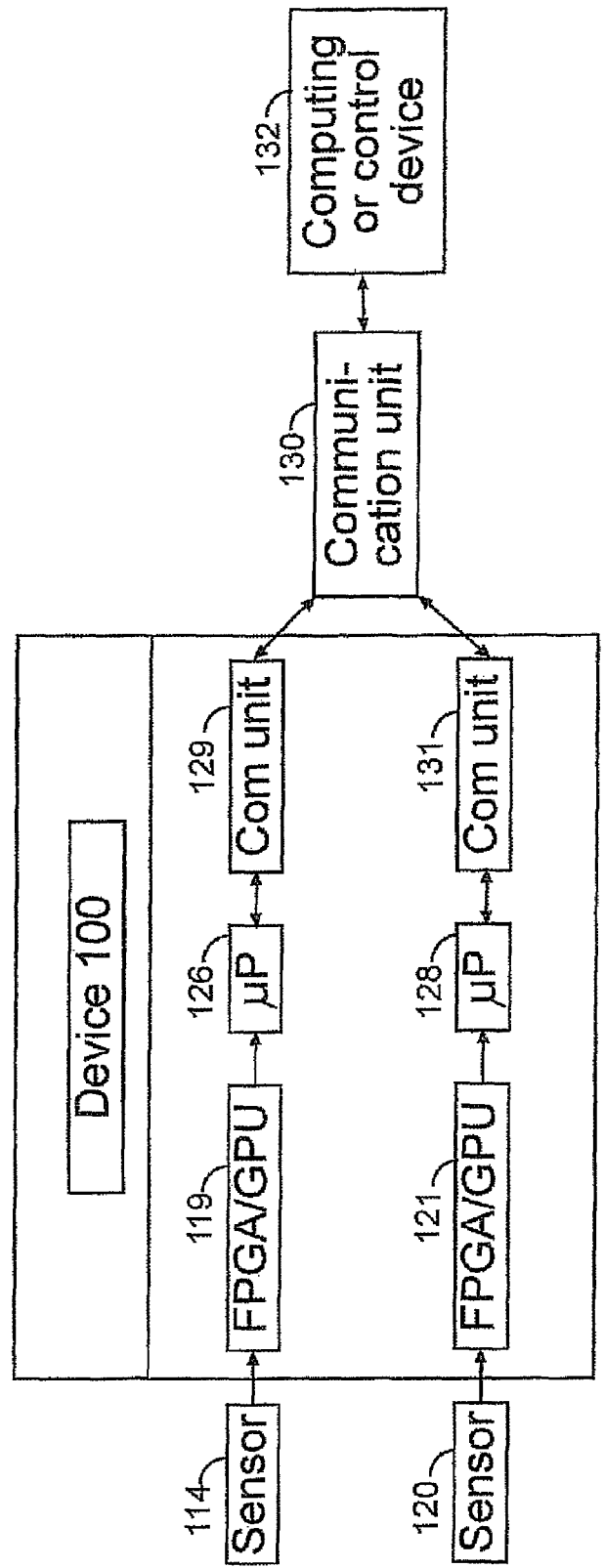
FIG. 7 shows a schematic flow diagram of the information flow of the present invention
Figure 8:
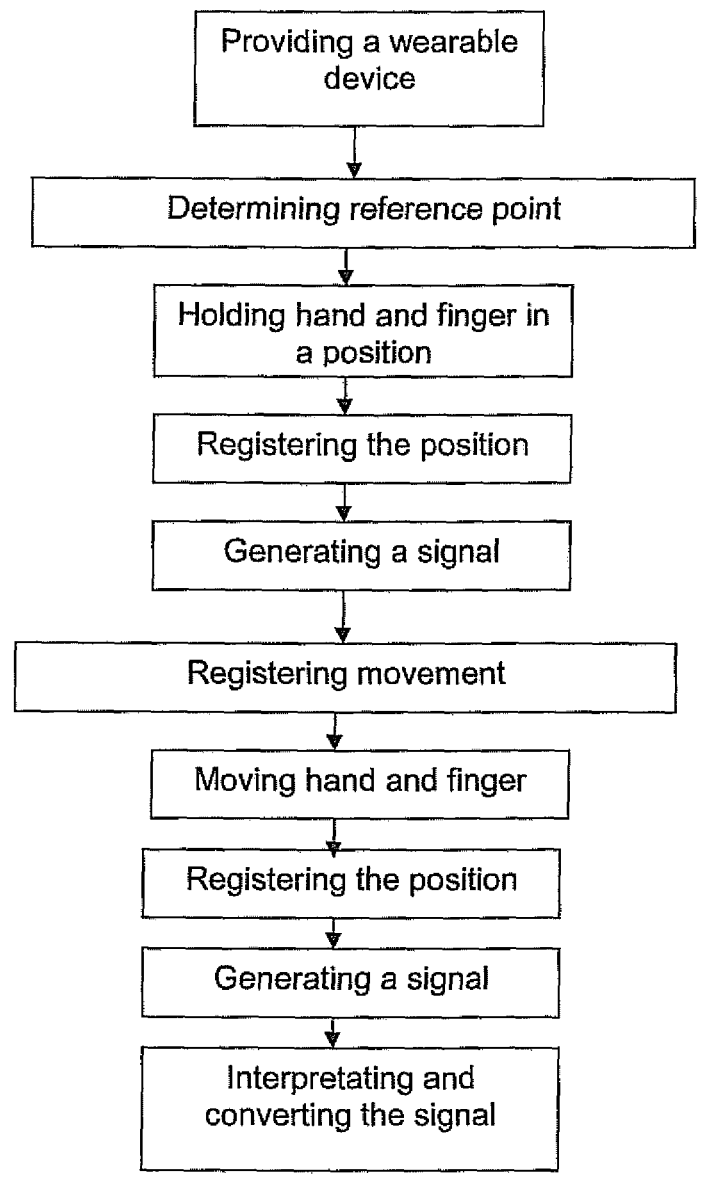
FIG. 8 shows a flow chart of a method of the invention

FIG. 7 is schematic diagram showing the information flow within the present invention. The wearable device 1 is connected to at least one left side sensor 114 corresponding to one or more sensor 48, 52, 54 and/or light source 50, which are directed to the fingers on the left hand of the user, and/or at least one right side sensor 120 corresponding to one or more sensor 48, 52, 54 and/or light source 50, which are directed to the right hand of the user. The sensors 114, 120 are in operative engagement with the computer device 100 so that the sensors 114, 120 may continuously send signals, as a result of registered positions and movements by the sensors 114, 120. The sensors 114, 120 continuously send signals to the calculating units 119, 121 respectively. The units 119, 121 are hardware devices that enable two or more signals to be calculated in the same circuit at the same time by temporarily combining them into a single signal. The units can 119 and 121 either be an Application Specific Integrated Circuit (ASIC), a Field Programmable Gate Array (FPGA) or Graphical Processing Unit (GPU), or a combination of these components. The units 119 and 121 are performing image-analysis of the information from the one or more sensor 48, 52, 54 and/or light source 50 using algorithms to determine the location of the finger tips, and the location of the hand external feature-points in order to obtain both relative motion and absolute positioning of the finger(s) and or hand(s) both in terms of position and orientation. On the receiving end, the signals are divided again by a demultiplexer that may be part of a microprocessors 126, 128. Values are continuously being sent from the sensors 114, 120 to the calculation units 119, 121 that in turn send instructions to both sensors and multiplexer units. The microprocessors 126, 128 process the signals in mathematical operations, such as an artificial neural network system, before the signals are sent via a communication unit 130 to a computing device 132 such as a computer or any other target device. Communication units 129, 131 are connected to the microprocessors 126, 128. The units 129, 131 are also connected to the communication unit 130. The unit 130 may be connected to the receiver via any suitable communication technology such as infrared, sound, cable or radio-transmission. The computing device 132 may comprise a screen to display text, symbol or gesture.

The wearable device 1 is in operative engagement with a computer device 100. The one or more component 114, 120, 119, 121, 126, 128, 129, 131, 130, 132 from the computer device 100 may be comprised in the logic unit 44. Alternatively, said components are separated from the logic unit 44.

Figure 5:
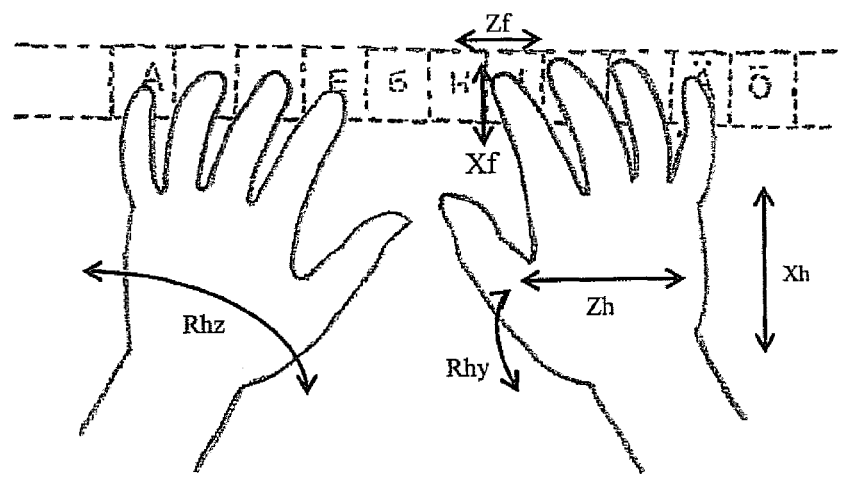
FIG. 5 shows a top view of the position of hands and fingers on a keyboard
Figure 6:
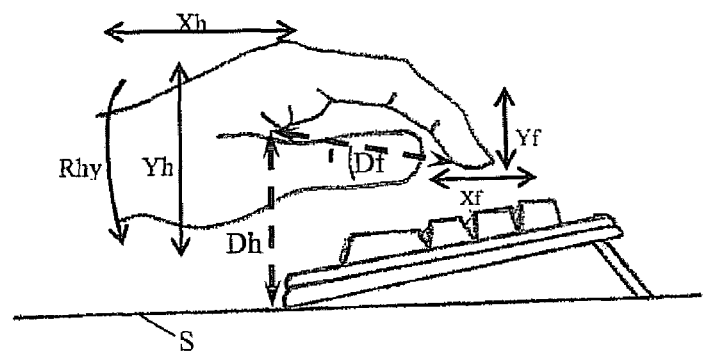
FIG. 6 shows a side view of the position of a hand and fingers on a keyboard

FIG. 5 shows a schematic top view of a left and a right hand using the middle row of a qwerty-keyboard. FIG. 6 shows a side view of a hand using a qwerty-keyboard. The hand may move in different directions in relation to the surface S under the hands. The fingers may also move in different directions relative to the surface S under the hands and/or relative to the wearable device 1. The palm of the hand may be substantially parallel to the surface S under the hand. From the starting position shown in FIG. 5, 6, the hands may move horizontally along a first axis Xh or along a second horizontal axis Zh perpendicular to the first axis Xh. The first and second axes Xh, Zh may extend substantially parallel to the surface S. The hands may also move vertically along a vertical axis Yh perpendicular to the first and second horizontal axes Xh, Zh. Thereby, a distance Dh between the palm of the hand and the surface S increases or decreases. The fingers and hands may thus make a translational movement along the three axis X, Z and Y.

The hands may also rotate. The hands may make a rotational movement around the three axis X, Z and Y. For example, the hand may rotate around the vertical Yh axes (a rotation Rhz in FIG. 5), whereby the hands rotate in relation to the fixed under arm substantially over the area defined by the horizontal Xh and Zh axes and thus substantially parallel to surface S. In another example, the hand may rotate around the Xh axis (rotation Rhy in FIG. 5, 6), whereby the hands rotate by rotating the under arm, thereby increasing or decreasing the distance of the thumb to the surface S.

The fingers can also make translational movements and may move along the horizontal Z and X axis as indicated by arrows Zf and Xf in FIG. 5. The fingers may move vertically along the axis Yf as shown in FIG. 6.

The fingers may also move rotationally around the three axis Xf, Zf and Zf.

The fingers and hands may move along all three axes X, Y and Z, when typing on a virtual keyboard or using a virtual key stick or making gestures as in hand language.

A method of using the wearable device 1 involves registration of positions of at least one finger and/or at least one hand. Preferably, the position of all fingers and the position of both hands are continuously registered.

The method may involve the determination of a reference point as a starting position. For example, a person could hold both hands as if typing the keys of the middle row of a qwerty-keyboard, whereby one or more fingers contact the surface S under the hands. One way of determining the reference point may be by holding the hands and fingers attached to the wearable device 1 in a position for a couple of seconds after having pressed the on-button of the device 1.

An accelerometer could be used, which may be comprised in the logic unit 44. This accelerometer may generate a response when one or more fingers in the starting position touch the surface S under the hands. After registration in this first step, a signal may be generated based on the registered hand and finger position.

The reference point may be a position under the hand on a surface S. Or the reference point may be different for the fingers and the hand. For the fingers, the reference point may be the wearable device 1. For the hand, the reference point may be the surface S under the hand. Likewise, any part of a human body, for example, a thigh, chest or belly, may be used as a reference point. In some cases the surface S under the hand may be a surface on the human body. A surface above the hands may be used as a reference point when sensor 54 is used in the wearable device 1 such as a ceiling in a room. Also, the different sensors 48, 52 and light source 50 may use the same or a different reference point such as the surface S under the hands and the chest of the human body.

The method may involve a second step of calibrating/measuring movements of at least one finger and/or hand by moving said finger in one or more predetermined direction and distance in relation to the reference point. For example by moving the fingers and/or hand over the horizontal X, Z and vertical Y axis, the device is able to learn to interpretate the positional changes of the moving fingers and/or hand.

Changing positions of the finger by moving the finger can be measured by measuring the position of the distal end of the finger in relation to the wearable device 1 or sensor unit 14. For example by typing on a virtual keyboard in step 2, the distance Df for example decreases when the left pointing finger is moved from the 'f'-key to the 'c'-key on the virtual keyboard. Changing the position of the hand can be measured by measuring the position of the hand in relation to the surface S under and optionally above the hand. After registration, a signal may be generated based on the registered finger position. The signal may then be interpreted and converted into a command to be processed by the computer device 100, thereby using the relation between the registered positions in the first and the second step. This second step may be repeated several times, such that different positions of the hand and fingers relative to the one or more reference point can be registered.

In an optional third step of learning and memorizing movement of the at least one finger and/or hand the at least one finger and/or hand may be moved in a predetermined direction at a predetermined velocity. The position of said at least one finger in relation to the wearable device 1 and/or in relation to a surface S under the hand 12 may be registered and a signal may be generated based on the registered finger positions. The signal may then be interpreted and converted into a command to be processed by the computer device 100. Such an analysis may include analysing a pattern of movement signals. The method may further comprise the possibility for memorizing and learning from the user's corrections when the user sees which command is being displayed on a screen comprised in the computer device 100.

In a fourth step, the at least one finger and/or hands can move to input data virtually into the computer device 100. The data can be displayed on for example a computer screen or a screen of a tablet, a personal digital assistant (PGA) or a smart phone.

When typing on a keyboard, the position of the fingers and hand changes within an area around the keys of the keyboard. Positional changes of the finger(s) and hand(s) within a certain area around the reference point may thus be programmed or learned and memorized as typing of a certain key on a keyboard. When the hand is moved outside of this area, or when the hand is rotated, the movement made by the hand, may be programmed for producing a different signal, e.g. for switching from keyboard mode to mouse mode or joystick mode. Alternatively, the speed of movement of the hand in relation to the reference point can be used for programming a different signal that is not present on the keyboard, for example the speed of the mouse.

Because the one or more sensors 48, 52, 54 and optionally the light source 50 are continuously sending signals and these signals are continuously measured, it is possible to pre-set a signalling level that will trigger an event that a finger impact has occurred. It is important to note that it is not necessary for the user or operator to hit a specific spot on a surface S or to type on a conventional keyboard. It is enough to make a sufficient movement with the distal end of the finger and/or an indication of direction of the movement of the hand to transmit a signal regardless where the finger tip is.

Preferably, the wearable device 1 takes some degree of freedom for the movements of all fingers and hands into account before it determines which sign or gesture the user intended to activate. Preferably, not only the movement of the active finger but also movement of the adjacent fingers and hand are used when determining which sign, gesture or command the user intended.

The command may be such that the position and movement of a finger and hand is associated with a symbol, gesture or sign language or a manipulation of an electrical symbol displayed on a screen. For example, when the position of one hand is registered in relation to the position of the other hand, a rotational movement of both hands, such that the palms of both hands face each other, may be translated as a symbol for distance. The distance between the hands may then be a measure for a distance to be indicated on a screen.

The method may also provide the possibility to, for example, rotate the hand to electronically move the symbol on the screen in the first direction without the hand travelling in the same direction. Or moving the hand in a direction along a Z or Y axis to electronically move the symbol on the screen in the same direction.

The method may further comprise a predetermined movement of the at least one finger and/or hand to switch the symbol on the screen between keyboard mode, mouse mode, joystick mode and gesture mode.

In addition, the method may comprise a predetermined movement of the at least one finger and/or hand to change the speed of the electronic movement of the symbol on the screen.

Preferably, the method comprises the possibility to analyze finger and/or hand movements to learn and memorize the finger movements that result in the generation of the command.

The artificial neural network may remove certain letter possibilities as very unlikely and the language processor may carry on the analysis to finally determine, which symbol or letter is intended by reviewing columns of letters. The module is efficient at determining sideway movements to for example determine the differences between the letters "f" and "g". The module may also learn how most people type certain letters or symbols or how most people make certain gestures by letting a large group of people repeat the finger and hand movements associated with said letter, symbols and gestures. The module may analyse patterns of movements and filter away unlikely letters, symbols or gestures. The module may thus be trained to recognize which sign, symbol or gesture is intended by the user. The module may also be trained to recognize the movements made by a particular user. The speed of the movement can be taking into account in the above learning processes.

All of the method steps, as well as any sub-sequence of steps, described above may be controlled by means of a programmed computer apparatus, preferably located in the device 100. Moreover, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the procedure according to the invention. The program may either be a part of an operating system, or be a separate application. The carrier may be any entity or device capable of carrying the program. For example, the carrier may comprise a storage medium, such as a Flash memory, a ROM, for example a DVD, a CD, an EPROM, an EEPROM, or a magnetic recording medium, for example a floppy disc or hard disc. Further, the carrier may be a transmissible carrier such as an electrical or optical signal, which may be conveyed via electrical or optical cable or by radio or by other means. When the program is embodied in a signal, which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant procedures.

The term "comprises/comprising" when used in this specification is taken to specify the presence of stated features, integers, steps or components. However, the term does not preclude the presence or addition of one or more additional features, integers, steps or components or groups thereof.

The term "translational movement" as used in this specification refers to a substantially linear movement.

The term "rotation" or "rotational movement" as used in this specification refers to a substantially rotating movement.

The term "movement" or "moving" or "move" as used in this specification refers to a rotating and/or linear movement, unless indicated otherwise.

The term "symbol" as used in this specification is to be interpreted in the broadest sense and includes, without limitation, any electrical symbol displayable on a screen and any symbol that can be made by fingers and hands.

The present invention is not limited to the embodiments disclosed but may be varied and modified within the scope of the following claims.

The invention claimed is:

1. A wearable device for determining a position of at least one finger of a hand relative to a predetermined reference point comprising:
   a sensor device configured to be arranged in the palm of the hand comprising:
      at least one first sensor which is an image sensor directed towards a respective distal end of the at least one finger and configured to determine the position of the finger in relation to the wearable device, the at least one first sensor being configured to register positions of said at least one finger in relation to the wearable device; and
      a logic device in operative engagement with a computer device and configured to generate a position signal based on the registered finger position, and to interpret and convert the signal to a command to be processed by the computer device;
   a housing at least partly enclosing the sensor device having an opening for the at least one sensor; and
   an attachment member configured to attach the sensor device to the hand, and
   the sensor device further comprises a second sensor, which is a camera directed towards a respective distal end of the at least one finger and configured to, in cooperation with the first image sensor, obtain accurate 3D-measurements of the position of the distal end of the at least one finger and to determine at least one of the position and orientation of the hand relative to the surface under the hand, in relation to the other hand, or in relation to another part of a human body,
   wherein the logic device further comprises an inertia measurement device configured to also measure a translational and rotational movement of the hand, and that the first and second sensors and the inertia measurement device are configured to send digital signals, as a result of registered positions and movements by the first and second sensors and the inertia measurement device,
   wherein the first and second sensors continuously send digital signals to respective calculating devices that enable two or more signals to be calculated in the same circuit at the same time by temporarily combining them into a single signal enabling measurement of the movements of at least one finger and of the hand by moving said finger in one or more predetermined direction and distance in relation to the reference point and in a predetermined direction at a predetermined velocity, and
   wherein for the fingers, the reference point is the wearable device, and for the hand, the reference point is the surface under the hand.

2. The wearable device according to claim 1, wherein the at least one sensor is also configured to determine the position of the at least one finger and hand in relation to a surface under the hand.

3. The wearable device according to claim 1, wherein the at least one sensor uses ambient light.

4. The wearable device according to claim 1, wherein the at least one sensor uses structured light.

5. The wearable device according to claim 1, wherein the calculation devices are selected from an Application Specific Integrated Circuit (ASIC), a Field Programmable Gate Array (FPGA), Graphical Processing Unit (GPU), or a combination of these components.

6. The wearable device according to claim 1, wherein the sensor device further comprises a light source, which together with at least one of the first sensor or the second sensor, is configured to determine at least one of the position and orientation of the hand relative to the surface under the hand, in relation to the other hand, or in relation to another part of the human body.

7. The wearable device according to claim 1, wherein the sensor device further comprises a third sensor, which is an image sensor and comprised in an upper device, and configured to determine the position of the hand relative to an object or surface above the hand.

8. A method for determining a position of at least one finger on a hand relative to a predetermined reference point characterized in that the method comprises;
   providing a wearable device comprising:
      a sensor device configured to be arranged in a palm of the hand comprising:
         at least one first sensor, which is an image sensor directed towards a respective distal end of the at least one finger and configured to determine the position of the finger in relation to the wearable device, the at least one first sensor being configured to register respective distal end of the at least one finger, and a second sensor, which is a camera directed towards a respective distal end of the at least one finger and configured to, in cooperation with the first image sensor, obtain accurate 3D-measurements of the position of the distal end of the at least one finger and to determine at least one of the position and orientation of the hand relative to the surface under the hand, in relation to the other hand, or in relation to another part of a human body;
      a logic device in operative engagement with a computer device, wherein the logic device further comprises an inertia measurement device configured to also measure a translational and rotational movement of the hand, and that the first and second sensors and the inertia measurement device are configured to send digital signals, as a result of registered positions and movements by the first and second sensors and the inertia measurement device,
      wherein the first and second sensors continuously send digital signals to respective calculating devices that enable two or more signals to be calculated in the same circuit at the same time by temporarily combining them into a single signal enabling measurement of the movements of at least one finger and of the hand by moving said finger in one or more predetermined direction and distance in relation to the reference point and in a predetermined direction at a predetermined velocity;
      a housing at least partly enclosing the sensor device having an opening for the at least one sensor; and
      an attachment member configured to attach the sensor device to the hand;
   a first step of determining the reference point for the relative position of the hand and the at least one finger by holding the hand and the at least one finger in a predetermined position for a predetermined period, wherein the first step comprises:
      registering the position of said hand and at least one finger in relation to at least one of the wearable device or to a surface under the hand; and generating a signal based on the registered hand and finger position;

a second step of registering movement of the hand and at least one finger by moving at least one of said hand or finger in one or more predetermined direction and distance in relation to the reference point, wherein the second step comprises:

registering the positions of said hand and at least one finger in relation to at least one of the wearable device or to a surface under the hand;

generating a signal based on the registered hand and finger positions; and interpreting and converting the signal to a command to be processed by the computer device, thereby using the relation between the registered positions in the first and the second step;

optionally repeating the second step; and a third step of learning and memorizing movement of the hand and at least one finger by moving the hand and at least one finger in one or more predetermined direction at one or more predetermined velocity in relation to the predetermined reference point, wherein the third step comprises:

registering positions of said hand and at least one finger in relation to at least one of the wearable device or a surface under the hand, wherein for the fingers, the reference point is the wearable device, and for the hand, the reference point is the surface under the hand;

generating a signal based on the registered hand and finger positions; and interpreting and converting the signal to a command to be processed by the computer device.

9. The wearable device according to claim 8, wherein the at least one sensor is configured to register a movement of the at least one finger in relation to the predetermined reference point along a first horizontal axis, along a second horizontal axis perpendicular to the first horizontal axis and along a vertical axis perpendicular to the first and second horizontal axes.

10. The wearable device according to claim 8, wherein he at least one sensor is configured to register a position and movement of at least one hand in relation to the predetermined reference point along a first horizontal axis, along a second horizontal axis perpendicular to the first horizontal axis and along a vertical axis perpendicular to the first and second horizontal axes.

11. The method according to claim 8, wherein the calculation devices are selected from an Application Specific Integrated Circuit (ASIC), a Field Programmable Gate Array (FPGA), Graphical Processing Unit (GPU), or a combination of these components.

12. The method according to claim 8, wherein the computer device comprises a screen configured to visualize one or more processed command as an electrical symbol on the screen.

13. A computer program product stored on a non-transitory computer readable medium, said computer program product comprising computer code instructions configured to cause a computer device to determine a position of at least one finger on a hand relative to a predetermined reference point using a sensor device configured to be arranged in a palm of the hand, said sensor device comprising:

at least one first sensor, which is an image sensor directed towards a respective distal end of the at least one finger and configured to determine the position of the finger in relation to the wearable device, the at least one first sensor being configured to register respective distal end of the at least one finger, and a second sensor, which is a camera directed towards a respective distal end of the at least one finger and configured to, in cooperation with the first image sensor, obtain accurate 3D-measurements of the position of the distal end of the at least one finger and to determine at least one of the position and orientation of the hand relative to the surface under the hand, in relation to the other hand, or in relation to another part of a human body;

a logic device in operative engagement with a computer device, wherein the logic device further comprises an inertia measurement device configured to also measure a translational and rotational movement of the hand, and that the first and second sensors and the inertia measurement device are configured to send digital signals, as a result of registered positions and movements by the first and second sensors and the inertia measurement device, wherein the first and second sensors continuously send digital signals to respective calculating devices that enable two or more signals to be calculated in the same circuit at the same time by temporarily combining them into a single signal enabling measurement of the movements of at least one finger and of the hand by moving said finger in one or more predetermined direction and distance in relation to the reference point and in a predetermined direction at a predetermined velocity;

a housing at least partly enclosing the sensor device having an opening for the at least one sensor; and an attachment member configured to attach the sensor device to the hand;

the computer program product comprising at least one non-transitory computer-readable medium having computer-readable program code portions embodied therein, the computer-readable program code portions comprising:

an executable portion configured to perform a first step of determining the reference point for the relative position of the hand and the at least one finger by holding the hand and the at least one finger in a predetermined position for a predetermined period, wherein the first step comprises:

registering the position of said hand and at least one finger in relation to at least one of the wearable device or a surface under the hand; and generating a signal based on the registered hand and finger position;

an executable portion configured to perform a second step of registering movement of the hand and at least one finger by moving said hand and finger in one or more predetermined direction and distance in relation to the reference point, wherein the second step comprises:

registering the positions of said hand and at least one finger in relation to at least one of the wearable device or a surface under the hand;

generating a signal based on the registered hand and finger positions; and interpreting and converting the signal to a command to be processed by the computer device, thereby using the relation between the registered positions in the first and the second step;

an executable portion configured to optionally repeating the second step; and an executable portion configured to perform a third step of learning and memorizing movement of the hand and at least one finger by moving the hand and at least one finger in one or more predetermined direction at one or more predetermined velocity in relation to the predetermined reference point, wherein the third step comprises:

registering positions of said hand and at least one finger in relation to at least one of the wearable device or a surface under the hand, wherein for the fingers, the reference point is the wearable device, and for the hand, the reference point is the surface under the hand;

generating a signal based on the registered hand and finger positions; and interpreting and converting the signal to a command to be processed by the computer device.

* * * * *